United States Patent [19]
Shiono et al.

[11] Patent Number: 5,519,803
[45] Date of Patent: May 21, 1996

[54] OPTICAL WAVEGUIDE

[75] Inventors: Yoshiyuki Shiono; Masayuki Tanno; Shohei Kozakai; Toshihiko Ryuo, all of Gunma, Japan

[73] Assignee: Shin-Etsu Chemical Co., Ltd., Tokyo, Japan

[21] Appl. No.: 302,182

[22] Filed: Sep. 9, 1994

[30] Foreign Application Priority Data

Sep. 22, 1993 [JP] Japan .................................. 5-236560
Nov. 16, 1993 [JP] Japan .................................. 5-286529

[51] Int. Cl.$^6$ ............................................. G02B 6/10
[52] U.S. Cl. ................................. 385/132; 385/14
[58] Field of Search ........................ 385/14, 129, 130, 385/132

[56] References Cited

U.S. PATENT DOCUMENTS

| | | | |
|---|---|---|---|
| 3,934,061 | 1/1976 | Keck et al. | 385/129 |
| 4,904,037 | 2/1990 | Imoto et al. | 385/14 |
| 5,076,654 | 12/1991 | Presby | 385/14 |
| 5,080,962 | 1/1992 | Hench | 385/130 |
| 5,117,470 | 5/1992 | Inoue et al. | 385/14 |

*Primary Examiner*—Rodney B. Bovernick
*Assistant Examiner*—Robert E. Wise
*Attorney, Agent, or Firm*—McAulay Fisher Nissen Goldberg & Kiel

[57] ABSTRACT

Proposed is an improved optical waveguide consisting of a substrate plate such as a silicon wafer, an undercladding layer of silica glass thereon, a core line of silica glass extending on the undercladding layer and having a larger refractive index than the undercladding layer and an overcladding layer of silica glass having a smaller refractive index than the core line to cover the undercladding layer and the core line thereon altogether. Different from conventional optical waveguides of this type, of which each of the undercladding layer, core line and overcladding layer is formed by the flame deposition method of silica or electron-beam vapor deposition method followed by vitrification taking a relatively long time, the overcladding layer in the inventive optical waveguide is formed by forming a layer of an organopolysiloxane resin on the undercladding layer and core line followed by the oxidative thermal decomposition of the resin into silica and vitrification of the same. Alternatively, an optical waveguide, which is conventional as mentioned above but of which the thickness of the overcladding layer is greatly decreased, is provided with a top coating layer from the organopolysiloxane resin as above. The inventive optical waveguides can be manufactured with greatly increased productivity.

19 Claims, 1 Drawing Sheet

OPTICAL WAVEGUIDE

BACKGROUND OF THE INVENTION

The present invention relates to an optical waveguide or, more particularly, to an optical waveguide of fused silica glass with a remarkably low propagation loss to be suitable for use as an optical branch, which can be manufactured at low costs with good productivity.

Optical waveguide is an element in an optical fiber circuit used for coupling of lines or branching of lines. An optical waveguide has an integral structure, in which a transparent undercladding layer is formed on a substrate, such as a fused silica glass plate and a semiconductor silicon wafer, and a core line having a refractive index larger than that of the undercladding layer is formed on the undercladding layer while the undercladding layer and the core line thereon are altogether coated with an also transparent overcladding layer having a refractive index smaller than that of the core line. When the substrate is made from a transparent material such as fused silica glass, the substrate serves also as the undercladding layer so that no separate undercladding layer is required. Since optical fibers currently used for optical communication are predominantly made from fused silica glass, a preferable material for the optical waveguide is also fused silica glass in view of the good matching performance with the optical fibers.

A typical process for the preparation of an optical waveguide of fused silica glass described above is as follows by utilizing the flame deposition method and reactive ion etching method. Thus, a first porous layer of fine silica glass particles is formed by the flame deposition method on a substrate such as a silicon wafer and the porous layer is vitrified by heating at a high temperature in an electric furnace to form a transparent undercladding layer. Thereafter, a second porous layer of fine silica glass particles having a larger refractive index than the first is formed by the flame deposition method on the undercladding layer followed by vitrification into a transparent silica glass layer which is then subjected to the process of reactive ion etching to form an elongated core line having a square or rectangular cross section. Further, a third porous layer of fine silica glass particles having a smaller refractive index than the core line is formed by the flame deposition method on the core line and on the undercladding layer to form a covering layer which is vitrified to give a transparent overcladding layer which integrally covers the core line and the undercladding layer (see, for example, Optronics, 1988, No. 8, page 85). Sometimes, a protective top coating layer is formed on the overcladding layer.

Starting from a fused silica glass plate as the substrate, which serves also as the undercladding layer as is mentioned above, a method of electron-beam vapor deposition is proposed for forming, on the substrate, a porous silica glass layer which is vitrified and shaped into a core line of square or rectangular cross section by the reactive ion etching method followed by the formation of an overcladding layer in the same manner as above (see, for example, IEEE, 1991, page 483).

Though different in respect of the procedures for the formation of the undercladding layer and the core line, the above described two methods commonly utilize the flame deposition method for the formation of the overcladding layer.

In place of the procedure in the above described prior art method in which the silica glass layers are formed by the vitrification of a porous layer of silica particles deposited by the flame deposition method or electron-beam vapor deposition method, proposals have been made for the use of a silicon-containing polymeric resin as a precursor of silica according to which a layer of a silicone polymer is exposed to plasma in an atmosphere of oxygen (see Journal of Vacuum Science and Technology, volume 29, No. 17, page 1197) or heated in oxygen or in air (B. G. Bagley, Better Ceramics through Chemistry, page 287) to be converted into a layer of silica glass. Further, Japanese Patent Kokai 5-88036 teaches that each of the waveguide layers and core line can be formed from a glassy material derived from a heat-resistant organopolysiloxane.

Though advantageous in respect of the small propagation loss, the optical waveguide, for which the flame deposition method or the electron-beam vapor deposition method is employed for the formation of the core line, has several problems described below.

Namely, the flame deposition method, which is advantageous relative to the control of the refractive index of the vitrified layer because control of the refractive index can be performed by merely adding a dopant element to the starting material for the silica particles, unavoidably has a difficulty in the controllability of the layer thickness and uniformity in the thickness distribution of the layer so that satisfactory uniformity in the thickness of each layer can be ensured only by conducting lapping and polishing of each of the layers after vitrification.

The electron-beam vapor deposition method, on the other hand, is advantageous in the controllability of the layer thickness and uniformity in the layer thickness requiring no lapping treatment of each of the vitrified layers. A problem in the electron-beam vapor deposition method is in the relatively low velocity of silica deposition so that it is hardly practicable to apply this method to the formation of all of the three layers for the undercladding layer, core line and overcladding layer.

The method using an organopolysiloxane as a precursor of silica glass for the layers in an optical waveguide is indeed advantageous in respects of the controllability of refractive index of the silica glass, controllability of the layer thickness, uniformity of layer thickness and productivity. When the core line is formed by the reactive ion etching method or photolithographic method of the vitrified layer obtained from such an organopolysiloxane polymer as is disclosed in Japanese Patent Kokai 5-88036, the propagation loss of the optical waveguide cannot be small enough.

SUMMARY OF THE INVENTION

The present invention accordingly has an object to provide a silica glass-based optical waveguide free from the above described disadvantages and problems in the prior art optical waveguides.

Thus, the present invention, in a first aspect, provides an optical waveguide which is an integral body comprising:

(a1) a substrate plate;

(b1) a transparent undercladding layer of silica glass formed on the surface of the substrate plate;

(c1) a transparent elongated core line of silica glass having a square or rectangular cross section formed on the undercladding layer by the deposition of silica from the vapor phase to form a porous layer, vitrification of the porous layer and patterning of the vitrified layer into an elongated line; and (d1) a transparent overcladding layer of silica formed by coating the core line and undercladding layer altogether with an organopolysiloxane resin, heating the organopolysiloxane resin in an oxidizing atmosphere to form a layer of silica and vitrifying the layer of silica, the refractive index of the core line being larger than the refractive index of the undercladding layer and the overcladding layer.

Further, the present invention, in a second aspect, provides an optical waveguide which is an integral body comprising:

(a2) a substrate plate;

(b2) a transparent undercladding layer of silica glass formed on the surface of the substrate plate;

(c2) a transparent elongated core line of silica glass having a square or rectangular cross section formed on the undercladding layer by the deposition of silica from the vapor phase to form a porous layer, vitrification of the porous layer and patterning of the vitrified layer into an elongated line; and (d2) a transparent overcladding layer of silica formed on the surface of the core line and the undercladding layer altogether by the deposition of silica from the vapor phase to form a porous layer and vitrification of the porous layer; and (e2) a transparent top coating layer formed by coating the overcladding layer with an organopolysiloxane resin, heating the organopolysiloxane resin in an oxidizing atmosphere to form a layer of silica and vitrifying the layer of silica, the refractive index of the core line being larger than the refractive index of the undercladding layer and the overcladding layer.

DETAILED DESCRIPTION OF THE PREFERRED EMBODIMENTS

Figure 1:
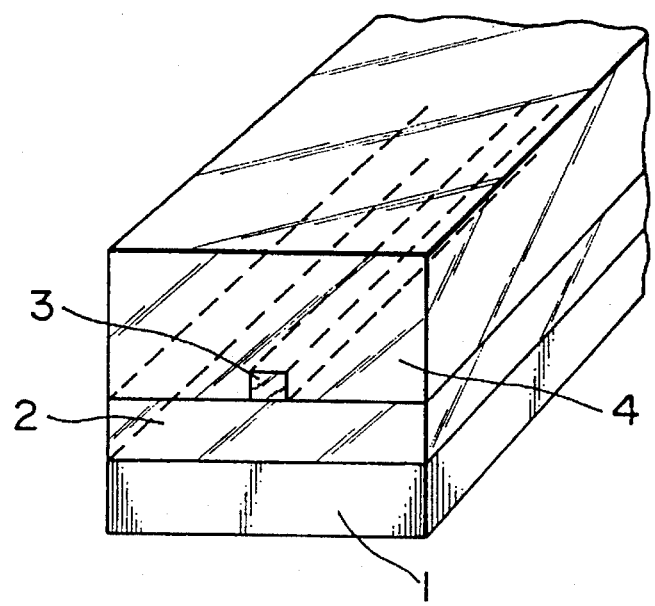
FIG. 1 is a partial perspective view of an optical waveguide consisting of a substrate, undercladding layer, core line and overcladding layer showing a cross section.
Figure 2:
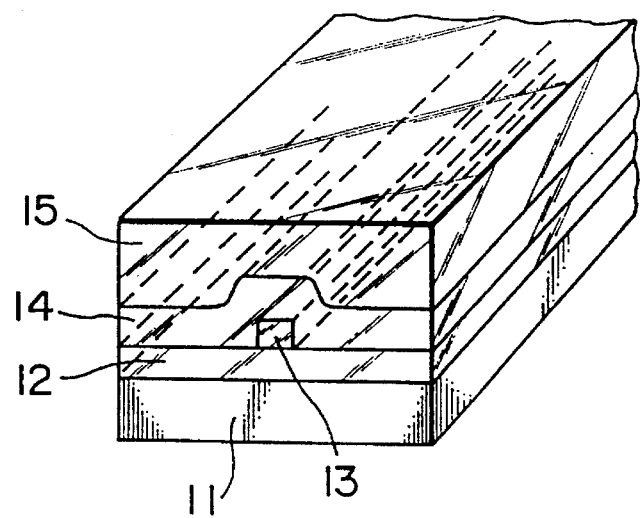
FIG. 2 is a partial perspective view of an optical waveguide consisting of a substrate, undercladding layer, core line, overcladding layer and top coating layer showing a cross section.

In the following, the optical waveguides of the invention according to the first and second aspects of the invention are described in more detail by making reference to FIGS. 1 and 2 illustrating an optical waveguide without or with a top coating layer, respectively.

The material of the substrate plate 1, 11 is not particularly limitative but preferable materials include semiconductor-grade silicon wafers and fused silica glass plates. The thickness of the substrate plate is not particularly limitative provided that a sufficient mechanical strength can be ensured thereby but it is usually in the range from 0.5 to 2.0 mm. When the substrate is a fused silica glass plate, which is of course a transparent material, the substrate plate 1, 11 also serves as an undercladding layer so that no separate undercladding layer 2, 12 need be formed on the substrate plate 1, 11. In a preferred embodiment of the invention, however, the substrate 1, 11 is a silicon wafer and an undercladding layer 2, 12 is formed thereon.

When a separate undercladding layer 2, 12 is to be formed on the surface of a silicon wafer as the substrate 1, 11, it is preferable that the undercladding layer 2, 12 of silica glass is formed by utilizing the flame deposition method. Namely, fine silica particles formed by the flame hydrolysis of a vaporizable silicon compound such as silicon tetrachloride in an oxyhydrogen flame are deposited on the surface of the substrate plate 1, 11 to form a first porous layer of fine silica particles which is then heated at a high temperature of 1250° to 1350° C. in an electric furnace to give a transparent silica glass layer 2, 12, which should have a thickness in the range from 10 to 1000 µm or, preferably, from 10 to 100 µm.

A core line 3, 13 is then formed on the undercladding layer 2, 12. Thus, a second layer of silica is formed on the undercladding layer 2, 12, preferably, by the electron-beam vapor deposition method and the silica-based layer is then vitrified by heating at a high temperature into a transparent silica glass layer. Since the core line 3, 13 must have a refractive index higher than that of the undercladding layer 2, 12, for example, by 0.3% to 1.0%, the silica glass used as the target of the electron-beam vapor deposition method also should have such an increased refractive index. When the silica glass forming the undercladding layer 2, 12 is pure silica glass, it is necessary that the silica glass for the core line 3, 13 has an increased refractive index over that of pure silica glass by admixing the silica glass with certain dopant ingredient, such as germanium dioxide $GeO_2$, having such an effect. The germanium dioxide-doped silica glass layer has a thickness, usually, in the range from 4 to 10 µm. The silica glass layer is then patterned into the form of an elongated line 3, 13 having a width of 4 to 10 µm and a square or rectangular cross sectional profile. The patterning method is not particularly limitative but the method of reactive ion etching can be applied satisfactorily.

According to the first aspect of the present invention providing an optical waveguide illustrated in FIG. 1, the undercladding layer 2 and the core line 3 formed thereon are altogether coated with an overcladding layer 4 of silica glass, which, however, is formed from an organosilicon polymer or an organopolysiloxane resin as the precursor of silica. Thus, the undercladding layer 2 and the core line 3 formed thereon are altogether coated with a solution of the organopolysiloxane resin followed by drying to form a resin layer which is then subjected to an oxidative thermal decomposition treatment by heating in an atmosphere of air or oxygen to be converted into a layer of silica which is then vitrified by heating at a high temperature. It is essential that the silica glass forming the overcladding layer 4 has a refractive index smaller, for example, by 0.3% to 1.0% than that of the core line 3. Such a controlled refractive index can be imparted to the silica glass by adequately selecting the chemical composition of the organopolysiloxane resin with modification of the organosiloxane units by introducing copolymeric units of another element having an effect to decrease the refractive index of the silica glass formed therefrom.

Such a modified organopolysiloxane resin is described in Japanese Patent Kokai 5-88036 and can be prepared from a di- or trifunctional hydrolyzable organosilane compound such as phenyl trichlorosilane, diphenyl dichlorosilane, phenyl triethoxy silane, pentyl trichlorosilane and the like in combination with a hydrolyzable compound of a metallic or inorganic element such as aluminum trichloride, phenyl trichlorogermanium, phosphorus trichloride, boron trichloride, bismuth trichloride, phenyl tin trichloride, tetrakis(trimethylsiloxy) titanium, diphenyl dichlorogermanium and the like. The overcladding layer of the resin-derived silica glass 4 can be obtained by coating the undercladding layer 2 and the core line 3 thereon with the resin, optionally, in the form of a solution by using a coating machine such as a spin coater to form a layer of the resin followed by an oxidative thermal decomposition and vitrification in an electric furnace at 1100° C. or higher in an oxidizing atmosphere. The thus formed overcladding layer 4 has a thickness, usually, in the range from 3 to 300 μm.

According to the second aspect of the invention, the inventive optical waveguide illustrated in FIG. 2 by a partial perspective view showing a cross section consists of a substrate plate 11, undercladding layer 12, core line 13, overcladding layer 14 and top coating layer 15, of which the structure, materials and method for the formation of the substrate plate 11, undercladding layer 12 and core line 13 can be the same as for the substrate plate 1, undercladding layer 2 and core line 3 in the optical waveguide according to the first aspect of the invention illustrated in FIG. 1. In the optical waveguide according to the second aspect of the invention, the overcladding layer 14 is formed not from an organopolysiloxane resin but by the deposition of fine silica particles to form a porous silica layer which is then vitrified into a transparent silica glass layer 14. Namely, the overcladding layer 14 can be formed in the same manner as in the formation of the undercladding layer 12, preferably, by the flame deposition method. Since the thickness of the overcladding layer 14 can be as small as 10 μm or smaller or, preferably, in the range from 3 to 10 μm, the electron-beam vapor deposition method can also be applied thereto without no particular adverse influence on the productivity. Although it is usual that the overcladding layer is required to have a thickness of several tens of micrometers in order to have a good efficiency of optical wave propagation and sufficient mechanical protection for the core line 13, the thickness of the overcladding layer 14 in this case can be very small but a top coating layer 15 is provided on the overcladding layer 14 to compensate for the deficiency due to the unduly small thickness of the overcladding layer 14. Needless to say, the silica glass of the overcladding layer 14 must have a refractive index smaller than that of the core line 13 so that, when the core line 13 is formed from a silica glass doped with germanium dioxide to have an increased refractive index, the overcladding layer 14 can be formed from pure silica glass.

The top coating layer 15 is then formed on the above described overcladding layer 14 by using an organopolysiloxane resin which can be the same as that used in the formation of the overcladding layer 4 in the optical waveguide according to the first aspect of the invention illustrated in FIG. 1. The refractive index of the top coating layer 15 can be equal to or somewhat smaller than that of the overcladding layer 14. The top coating layer 15 has a thickness of at least 3 μm or, preferably, in the range from 3 to 300 μm. When the thickness of the top coating layer is too small, the compensating effect for the deficiency due to the unduly small thickness of the overcladding layer 14 cannot be high enough along with insufficient mechanical protection while an unduly large thickness of the top coating layer 15 has no particular additional advantages.

In the following, the optical waveguide of the present invention is illustrated in more detail by way of examples as preceded by a description for the preparation of an organopolysiloxane resin used in the Examples.

Preparation of Organopolysiloxane Resin.

Into a flask of 100 ml capacity equipped with a stirrer, thermometer and reflux condenser were introduced 10 g of phenyl trichlorosilane, 1.3 g of anhydrous aluminum trichloride, 100 mg of potassium hydroxide and 15 ml of toluene to form a solution which was heated for 16 hours under reflux to effect co-condensation reaction of phenyl trichlorosilane and aluminum trichloride into a poly(phenyl aluminosiloxane) resin as a toluene solution. The solution contained a small amount of a precipitated matter which was removed by filtration. The thus obtained aluminoxane-modified organopolysiloxane resin gave a silica glass having a refractive index of 1.48 when the resin solution is dried and the resin is vitrified by heating at 1100° C.

EXAMPLE 1

Fine silica particles produced by the flame hydrolysis of silicon tetrachloride in an oxyhydrogen flame were deposited on one surface of a silicon wafer having a thickness of 0.5 mm as a substrate to form a porous layer of the silica particles having a thickness of 500 μm. The porous layer of silica particles on the substrate was heated in an electric furnace at 1300° C. for 90 minutes to give a vitrified silica glass layer having a thickness of 50 μm to serve as the undercladding layer.

Using germanium-modified silica glass consisting of 95% by weight of silicon dioxide and 5% by weight of germanium dioxide and having a refractive index larger by 0.3% than that of the undercladding layer as a target, a layer of silica was formed on the above formed undercladding layer by the electron-beam vapor deposition method followed by vitrification of the layer into a transparent silica glass layer having a thickness of 6 μm which was then patterned into a core line having a width of 6 μm and a length of 70 mm by the ion etching method through a resist layer formed by the photolithographic technology.

The undercladding layer and the core line formed thereon were altogether coated with the solution of the organopolysiloxane resin prepared above by using a spin coater to form a resin layer and, after drying, the resin layer was heated in an electric furnace at 1100° C. for 100 minutes to give a vitrified transparent silica glass layer having a thickness of 30 μm to serve as an overcladding layer.

The optical waveguide prepared in the above described manner was subjected to the measurement of the propagation loss of light from the ratio of the intensity of the light beam coming out of an end of the core line to the intensity of the incident light beam on the other end. The result of the calculation was that the propagation loss was 0.008 dB/cm so that the optical waveguide was found to be usable for practical uses, for example, as a branching unit of optical circuits.

EXAMPLE 2

An undercladding layer of silica glass having a thickness of 50 μm and a core line of germanium-doped silica glass having a 6 μm by 6 μm square cross section were successively formed on a silicon wafer in substantially the same manner as in Example 1. Instead of forming an overcladding layer on the undercladding layer and the core line thereon altogether by using the organopolysiloxane resin as a precursor of silica, an overcladding layer having a thickness of 10 μm was formed by the electron-beam vapor deposition method followed by vitrification. Further on the overcladding layer, a layer of the organopolysiloxane resin was formed with the resin solution prepared above using a spin coater followed by drying and a heat treatment at 1100° C. for 100 minutes to effect thermal decomposition of the organopolysiloxane and vitrification to give a transparent top coating layer having a thickness of 30 μm.

The thus prepared optical waveguide was subjected to the measurement of the propagation loss of light in the same manner as in Example 1 to give a result of 0.007 dB/cm, which value is small enough to support the practicability of the optical waveguide.

What is claimed is:

1. An optical waveguide precursor which is an integral body comprising:

a1) a substrate plate;

b1) a transparent undercladding layer of silica glass formed on the surface of the substrate plate;

c1) a transparent elongated core line of silica glass having a square or rectangular cross section formed on the undercladding layer by the deposition of silica from the vapor phase to form a porous layer, vitrification of the porous layer and patterning of the vitrified layer into an elongated line; and d1) a silica glass overcladding layer precursor comprising a coating of an organopolysiloxane resin on the core line and undercladding layer, the resin being capable of forming a transparent overcladding layer of silica glass having a refractive index less than the refractive index of the core line upon being subjected to an oxidizing atmosphere followed by vitrification; the refractive index of the core line being larger than the refractive index of the undercladding layer.

2. The optical waveguide as claimed in claim 1 in which the undercladding layer of silica glass has a thickness in the range from 10 to 1000 μm.

3. The optical waveguide as claimed in claim 1 in which the cross section of the core line of silica glass has a width and height each in the range from 4 to 10 μm.

4. The optical waveguide of claim 1 in which the resin coating is capable of forming an overcladding layer of silica glass having a thickness in the range from 3 to 300 μm.

5. An optical waveguide precursor which is an integral body comprising:

a2) a substrate plate;

b2) a transparent undercladding layer of silica glass formed on the surface of the substrate plate;

c2) a transparent elongated core line of silica glass having a square or rectangular cross section formed on the undercladding layer by the deposition of silica from the vapor phase to form a porous layer, vitrification of the porous layer and patterning of the vitrified layer into an elongated line; and d2) a transparent overcladding layer of silica glass formed on the surface of the core line and the undercladding layer altogether by the deposition of silica from the vapor phase to form a porous layer and vitrification of the porous layer; and e2) a transparent top coating silica glass layer precursor comprising a coating of an organopolysiloxane resin on the core line and undercladding layer, the resin being capable of forming a transparent overcladding layer of silica glass having a refractive index less than the refractive index of the core line upon being subjected to an oxidizing atmosphere followed by vitrification; the refractive index of the core line being larger than the refractive index of the undercladding layer.

6. The optical waveguide as claimed in claim 5 in which the undercladding layer of silica glass has a thickness in the range from 10 to 1000 μm.

7. The optical waveguide as claimed in claim 5 in which the cross section of the core line of silica glass has a width and height each in the range from 4 to 10 μm.

8. The optical waveguide as claimed in claim 5 in which the overcladding layer of silica glass has a thickness in the range from 3 to 10 μm.

9. The optical waveguide of claim 5 in which the resin coating is capable of forming an overcladding layer of silica glass having a thickness in the range from 3 to 300 μm.

10. The optical waveguide of claim 5 in which the organopolysiloxane resin is capable of forming a silica glass top coating layer having a refractive index not larger than the refractive index of the overcladding layer.

11. A method for preparing an optical waveguide which is an integral body comprising forming a transparent undercladding layer of silica glass on the surface of a substrate plate, forming a transparent elongated core line of silica glass having a square or rectangular cross section on the undercladding layer by depositing silica from the vapor phase to form a porous layer, vitrifying the porous layer and patterning the vitrified layer into an elongated line; and coating the core line and undercladding layer altogether with an organopolysiloxane resin, heating the resin coating in an oxidizing atmosphere to form a layer of silica and vitrifying the layer of silica to form a transparent overcladding layer of silica glass, wherein the refractive index of the core line is greater than the refractive index of the undercladding layer and the overcladding layer.

12. The method of claim 11 wherein the undercladding layer of silica glass has a thickness in the range from 10 to 1000 μm.

13. The method of claim 11 wherein the cross section of the core line of silica glass has a width and height each in the range from 4 to 10 μm.

14. A method for making an optical waveguide which is an integral body comprising forming a transparent undercladding layer of silica glass on the surface of a substrate plate, forming a transparent elongated core line of silica glass having a square or rectangular cross section on the undercladding layer by depositing silica from the vapor phase to form a porous layer, vitrifying the porous layer and patterning the vitrified layer into an elongated line; forming a transparent overcladding layer of silica glass on the surface of the core line and the undercladding layer by depositing silica thereon from the vapor phase to form a porous layer and vitrifying the porous layer; and forming a transparent top coating layer of silica glass by coating the overcladding layer with an organopolysiloxane resin, heating the organopolysiloxane resin in an oxidizing atmosphere to form a layer of silica and vitrifying the silica layer, wherein the refractive index of the core line is larger than the refractive index of the undercladding layer and the overcladding layer.

15. The method of claim 14 wherein the undercladding layer of silica glass has a thickness in the range from 10 to 1000 μm.

16. The method of claim 14 wherein the cross section of the core line of silica glass has a width and height each in the range from 4 to 10 μm.

17. The method of claim 14 wherein the overcladding layer of silica glass has a thickness in the range from 3 to 10 μm.

18. The method of claim 14 wherein the top coating layer of silica glass has thickness in the range from 3 to 300 μm.

19. The method of claim 14 in which the organopolysiloxane resin is capable of forming a silica glass top coating layer having a refractive index not larger than the refractive index of the overcladding layer.

* * * * *